US011269968B1

(12) United States Patent
Gandhi et al.

(10) Patent No.: US 11,269,968 B1
(45) Date of Patent: Mar. 8, 2022

(54) SYSTEMS AND METHODS FOR OPTIMIZING AUTOMATIC DATA SELECTIONS

(71) Applicant: Meta Platforms, Inc., Menlo Park, CA (US)

(72) Inventors: Sonal Gandhi, Seattle, WA (US); Richard Dunham Hislop, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 137 days.

(21) Appl. No.: 16/435,012

(22) Filed: Jun. 7, 2019

(51) Int. Cl.
*G06F 16/00* (2019.01)
*G06F 16/9536* (2019.01)
*G06F 16/9538* (2019.01)
*G06F 16/954* (2019.01)
*G06F 16/958* (2019.01)

(52) U.S. Cl.
CPC ........ *G06F 16/9536* (2019.01); *G06F 16/954* (2019.01); *G06F 16/958* (2019.01); *G06F 16/9538* (2019.01)

(58) Field of Classification Search
CPC ............... G06F 16/9536; G06F 16/958; G06F 16/9538; G06F 16/954
See application file for complete search history.

(56) References Cited

U.S. PATENT DOCUMENTS

| 9,571,446 B2* | 2/2017 | Cashmore ............... H04L 65/60 |
| 9,756,091 B1* | 9/2017 | Davies ................. H04L 65/403 |
| 2017/0255632 A1* | 9/2017 | Raichelgauz ...... G06Q 30/0251 |

* cited by examiner

*Primary Examiner* — Hung Q Pham
(74) *Attorney, Agent, or Firm* — FisherBroyles, LLP

(57) ABSTRACT

Systems and methods for extracting data from digital messages for digital group compositions may include (1) identifying content that has been posted to a platform, (2) creating a social-engagement score for the content based on a measure of an amount of social engagement generated in response to the content, (3) determining that the social-engagement score surpasses a threshold, and (4) in response to determining that the social-engagement score surpasses the threshold, displaying the content within the platform as platform-recommended content. Various other methods, systems, and computer-readable media are also disclosed.

20 Claims, 4 Drawing Sheets

SYSTEMS AND METHODS FOR OPTIMIZING AUTOMATIC DATA SELECTIONS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
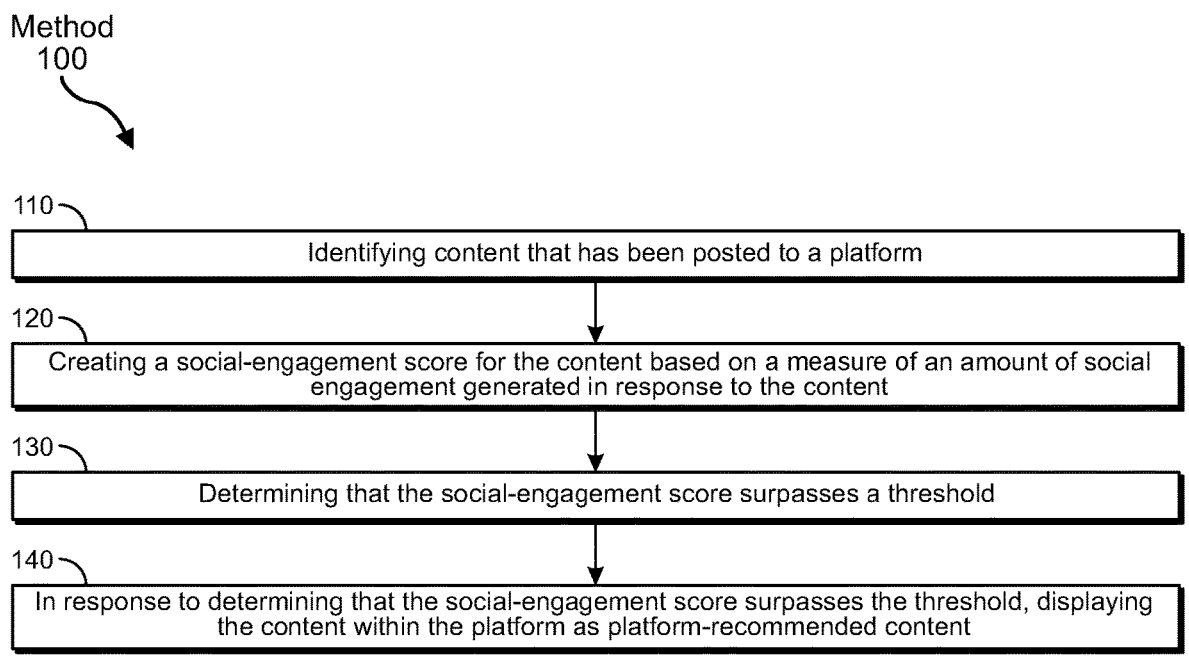
FIG. 1 is a flow diagram of an exemplary method for optimizing platform-recommended content based on a social-engagement metric.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Social media platforms provide their users with a variety of content. For instance, a social media platform may provide a user with connected content (e.g., content created by other users with whom the user is connected, such as the user's contacts). In some instances, a social media platform may additionally provide a user with non-connected content (e.g., content recommended by the social media platform). For example, a social media platform may include a "Recommended Videos" interface with videos recommended for viewing. As another example, a social media platform may intersperse posts that include recommended content (e.g., recommended sponsored content) among posts generated by a user's contacts within a newsfeed. Recommended content is often selected using an optimization system.

Traditional optimization systems are automated and select recommended content based on a view-metric (e.g., based on a number of views and/or a rate of views). However, at times content that a social media platform may not wish to associate with its brand (e.g., violent and/or hateful content) may receive a high number or rate of views. In such instances, a traditional optimization system may select recommended content that a platform does not wish to recommend. As such, the present disclosure identifies a need for improved systems and methods for selecting a platform's recommended content, in an automated fashion, that, in addition to selecting content with a high viewing record, selects content that aligns with the platform's brand.

As will be described in greater detail below, embodiments of the present disclosure may provide an automated optimization system that distinguishes content that aligns with a platform's brand (e.g., content the platform would be proud to recommend) from content that may not align with the platform's brand. In some examples, the optimization system may calculate Proud to Recommend (PTR) scores for content. These PTR scores may be based on a total amount of social engagement generated in response to content (e.g., a total number of likes, re-shares, and/or comments) and/or a rate of social engagement per view (e.g., a rate of likes, re-shares, and/or comments per view) for content. Then, the optimization system may use the PTR scores to select recommended-content items for a media-consumption interface, such as a recommended-video interface. In one example, the optimization system may limit, for a particular media-consumption interface, the number of recommended-content items with a PTR score that falls below a threshold. The limit may be fixed or adjustable (e.g., based on user viewing history). The optimization system may improve the functioning of a computer itself by improving content automatically selected by the computer as recommended content.

The following will provide, with reference to FIG. 1, detailed descriptions of computer-implemented methods for selecting platform-recommended content based on social engagement generated in response to the content. Detailed descriptions of corresponding example systems will also be provided in connection with FIG. 2. In addition, detailed descriptions of corresponding consumption interfaces that display platform-recommended content will be provided with FIGS. 3-4.

FIG. 1 is a flow diagram of an exemplary computer-implemented method 100 for selecting platform-recommend content based on social engagement generated in response to content. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 and/or modules operating in a user device 204 (e.g., as shown in exemplary system 200 in FIG. 2). In one example, each of the steps shown in FIG. 1 may represent an algorithm whose structure includes and/or is represented by multiple sub-steps, examples of which will be provided in greater detail below.

Server 202 generally represents any type or form of backend computing device that performs one or more social networking functions as part of a social networking platform (such as a platform 206) that manages server 202. Although illustrated as a single entity in FIG. 2, server 202 may include and/or represent a group of multiple servers that operate in conjunction with one another.

User device 204 may represent any type or form of computing device capable of reading computer-executable instructions. For example, user device 204 may represent a user device such as a smart phone and/or a tablet. Additional examples of user device 204 may include, without limitation, laptops, desktops with mobile elements, wearable devices, personal digital assistants (PDAs), etc. In some examples, a user 208 of user device 204 may have a user account with platform 206 and may have an instance of a social media application, which is managed by platform 206 and associated with user 208's account, installed on user device 204.

Figure 2:
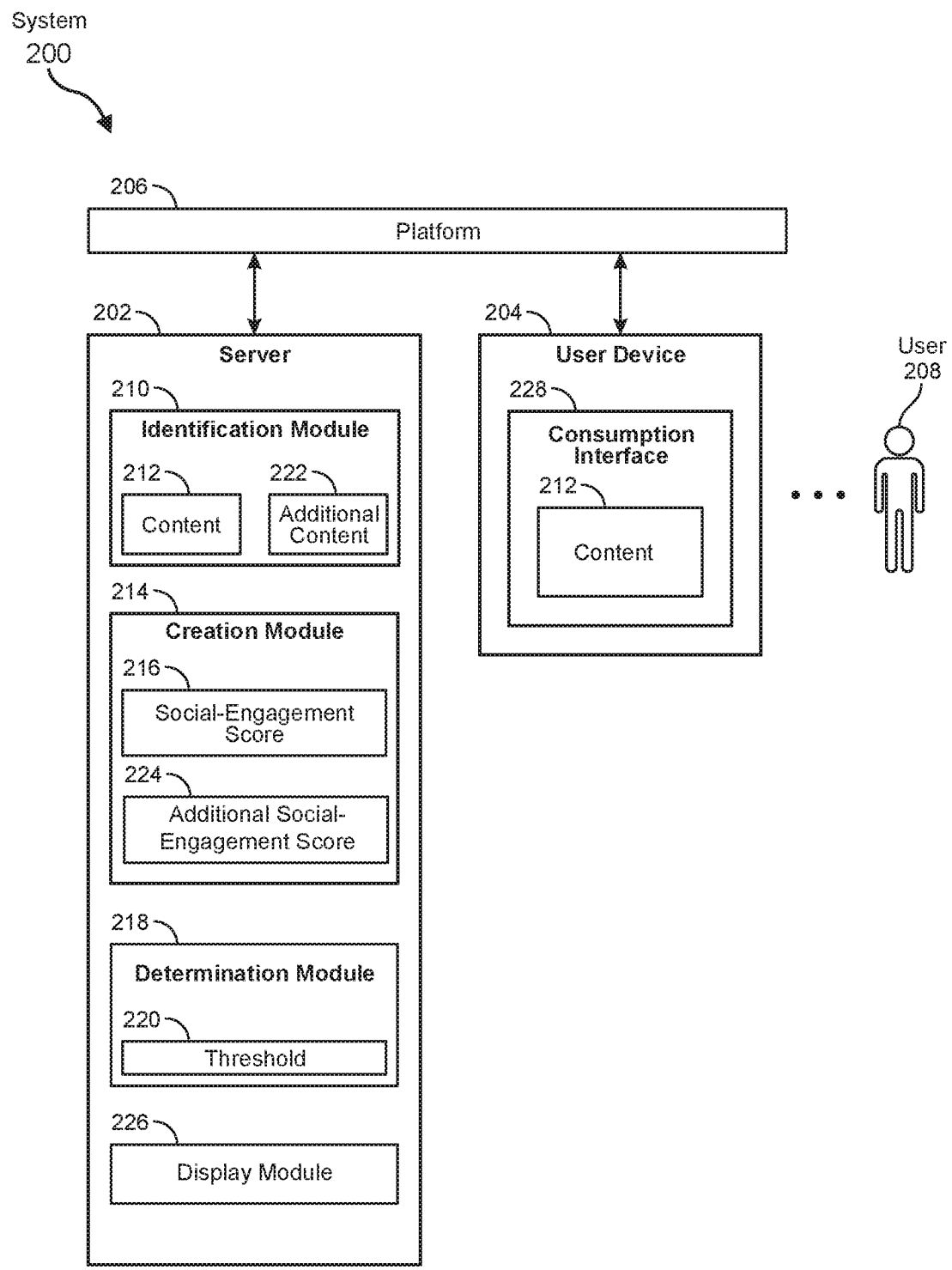
FIG. 2 is a block diagram of an exemplary system for optimizing platform-recommended content based on a social-engagement metric.

Returning to FIG. 1, at step 110, one or more of the systems described herein may identify content that has been posted to a platform. For example, as illustrated in FIG. 2, an identification module 210 may identify content 212 that has been posted to platform 206.

As used herein, the term "content" may refer to any type or form of media-based data posted within a social media platform. Examples of content 212 may include, without limitation, a digital video, a digital photograph, a gif, text, a document, an audio recording, a link, etc. In some examples, content 212 may be included within social media posts shared and/or posted within platform 206 (e.g., by a user account registered with platform 206 and/or an entity account registered with platform 206). In other examples, content 212 may be posted within a third-party outlet (e.g., a news outlet).

Identification module 210 may identify content 212 in a variety of ways. For example, identification module 210 may identify posted content that has been viewed via platform 206. In one embodiment, identification module 210 may identify content 212 based on a popularity metric. For example, identification module 210 may operate in accordance with a policy to identify content that has been viewed and/or posted more than a threshold amount (e.g., more than a threshold number of times within a time period). In this example, identification module 210 may identify content 212 in response to detecting that content 212 has been viewed and/or posted more than the threshold amount. In some examples, identification module 210 may additionally identify content 212 based on viewers' length of view (e.g., an average length of view) indicative of how long content 212 is watched for (e.g., a total length of time content 212 is watched for and/or a percentage of content 212's total length that is watched). In this example, identification module 210 may further identify content 212 in response to detecting that an average length of view for content 212 exceeds a threshold length of view.

In an additional or alternative embodiment, identification module 210 may identify content 212 based on the substance of content 212 (e.g., subject matter, a theme, etc.) and/or a source of content 212. For example, identification module 210 may operate in accordance with a policy to identify content with a particular substance and/or released by a particular source. As a specific example, the policy may instruct identification module 210 to identify content dealing with a recent event (e.g., the Academy Awards) and/or released by a particular source (e.g., CNN). In this embodiment, identification module 210 may identify content 212 in response to detecting that content 212 includes a particular substance and/or was released by a particular source. In some examples, identification module 210 may identify content 212 as part of a policy to retrieve identified content for an analysis. The analysis may determine whether the content may be promoted as platform-recommended content.

Returning to FIG. 1, at step 120, one or more of the systems described herein may create a social-engagement score for the content based on a measure of an amount of social engagement generated in response to the content. For example, as illustrated in FIG. 2, a creation module 214 may create a social-engagement score 216 for content 212 based on a measure of an amount of social engagement generated in response to content 212.

The term "social-engagement score" may refer to any type or form of measure of social engagement (e.g., a type, nature, origin, and/or volume of social engagement) expressed in relation to content on a social media platform. Examples of social engagement that may be expressed in relation to content may include, without limitation, a digital comment posted to the content, a posting or re-posting of the content, a digital mention of the content, and/or a graphical response (e.g., an emoji such as a like-emoji) affixed to the content.

Creation module 214 may calculate the measure of the amount of social engagement generated in response to content 212 in a variety of ways. For example, creation module 214 may calculate content 212's rate of social engagement per view (e.g., a number of social engagements generated in response to content 212 relative to a number of views received by content 212). In this example, social-engagement score 216 may represent content 212's rate of social engagement per view. As another example, creation module 214 may calculate a number of social engagements expressed by viewers of content 212 (e.g., a total number of social engagements expressed from a platform's user base and/or from a sample user base). In this example, social-engagement score 216 may represent a number of social engagements generated in response to content 212. In some examples, social-engagement score 216 may be based on a single type of social engagement. In other examples, social-engagement score 216 may be based on a combination of two or more types of social engagement. In these examples, different types of social engagement and/or combinations of social engagement may be weighted differently for calculating social-engagement score 216.

In certain embodiments, creation module 214 may calculate scores that are region-specific and/or interface-specific. In these embodiments, the user base utilized to identify social engagement may be limited to users residing and/or identifying from a particular region and/or to users accessing content via a particular type or version of consumption interface 228. In one embodiment, a threshold (such as threshold 220 described in connection with step 130) may vary based on a region for which social-engagement score 216 was calculated and/or a type or version of consumption interface 228 from which platform-recommended content is being accessed.

In some examples, social-engagement score 216 may be relied on as an indicator of users' willingness to associate themselves with content publically (e.g., an indicator of whether users are proud to recommend content). In these examples, social-engagement score 216 may be useful in distinguishing content that users are willing to associate with themselves (i.e., with their personal brand) from content that users view but may not be proud to recommend or have associated with themselves. Thus, by characterizing content based on the content's social-engagement score, the disclosed systems and methods may reliably identify content that may be violent, inappropriate, or otherwise offensive for a particular culture and/or region, as will be described in greater detail below.

Returning to FIG. 1, at step 130, one or more of the systems described herein may determine that the social-engagement score surpasses a threshold. For example, a determination module 218 may determine that social-engagement score 216 surpasses a threshold 220.

Determination module 218 may determine that social-engagement score 216 surpasses threshold 220 in a variety of ways (e.g., based on the manner in which creation module 214 calculates social-engagement score 216). For example, in examples in which creation module 214 calculates social-engagement score 216 based on content 212's rate of social engagement per view, determination module 218 may determine that social-engagement score 216 surpasses threshold 220 by determining that social-engagement score 216 surpasses a threshold rate of social engagement per view. Additionally or alternatively, in examples in which creation module 214 calculates social-engagement score 216 based on a number of social engagements expressed by viewers of content 212, determination module 218 may determine that social-engagement score 216 surpasses threshold 220 by determining that social-engagement score 216 surpasses a threshold number of social engagements.

Determination module 218 may operate in connection with a policy that makes variety of inferences based on social-engagement score 216 surpassing threshold 220. For example, the policy may infer that content with a social-engagement score that surpasses threshold 220 is content that individual users are proud to recommend (i.e., that individual users are amenable to having associated with their personal brands). Based on this inference, the policy may additionally infer that platform 206 may also be proud to recommend such content (i.e., may with confidence associate its brand with such content).

In certain examples, identification module 210 may have identified additional content 222, for which creation module 214 may have calculated an additional social-engagement score 224 (e.g., using the methodology described in connection with steps 110 and 120). In these examples, determination module 218 may determine that additional social-engagement score 224 falls below (i.e., doesn't meet) threshold 220.

Determination module 218 may determine that additional social-engagement score 224 falls below threshold 220 in a variety of ways (e.g., based on the manner in which creation module 214 calculates additional social-engagement score 224). For example, in examples in which creation module 214 calculates additional social-engagement score 224 based on additional content 222's rate of social engagement per view, determination module 218 may determine that additional social-engagement score 224 falls below threshold 220 by determining that additional social-engagement score 224 falls below a threshold rate of social engagement per view. Additionally or alternatively, in examples in which creation module 214 calculates additional social-engagement score 224 based on a number of social engagements expressed by viewers of additional content 222, determination module 218 may determine that additional social-engagement score 224 falls below threshold 220 by determining that additional social-engagement score 224 falls below a threshold number of social engagements.

Determination module 218 may operate in connection with a policy that makes variety of inferences based on additional social-engagement score 224 falling below threshold 220. For example, the policy may infer that content with a social-engagement score that falls below threshold 220 is content that individual users may be interested in viewing but that individual viewers may not be proud to recommend (i.e., may not wish to associate with their personal brands). Based on this inference, the policy may additionally infer that platform 206 may also not wish to recommend such content or have such content associated with its brand.

Finally, at step 140, in response to determining that the social-engagement score surpasses the threshold, one or more of the systems described herein may display the content within the platform as platform-recommended content. For example, as illustrated in FIG. 2, a display module 226 may display content 212 within platform 206 as platform-recommended content.

In one example, display module 226 may display content 212 as recommended non-connected content within a media-consumption interface (such as a consumption interface 228) sponsored by platform 206. In some examples, consumption interface 228 may only include recommended non-connected content. In other examples, consumption interface 228 may include a combination of connected content and recommended non-connected content.

Figure 3:
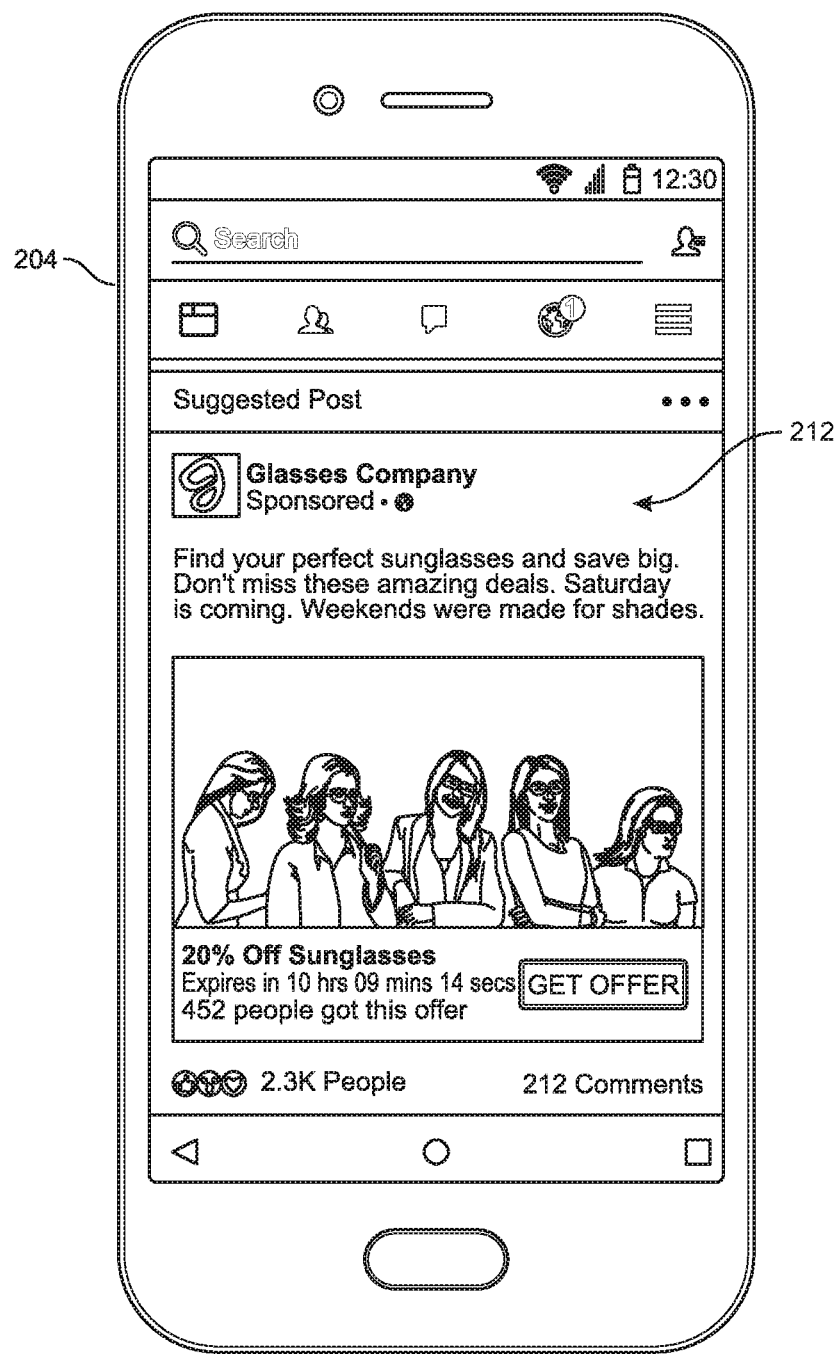
FIG. 3 is an illustration of an exemplary consumption interface in which exemplary platform-recommended content is displayed.
Figure 4:
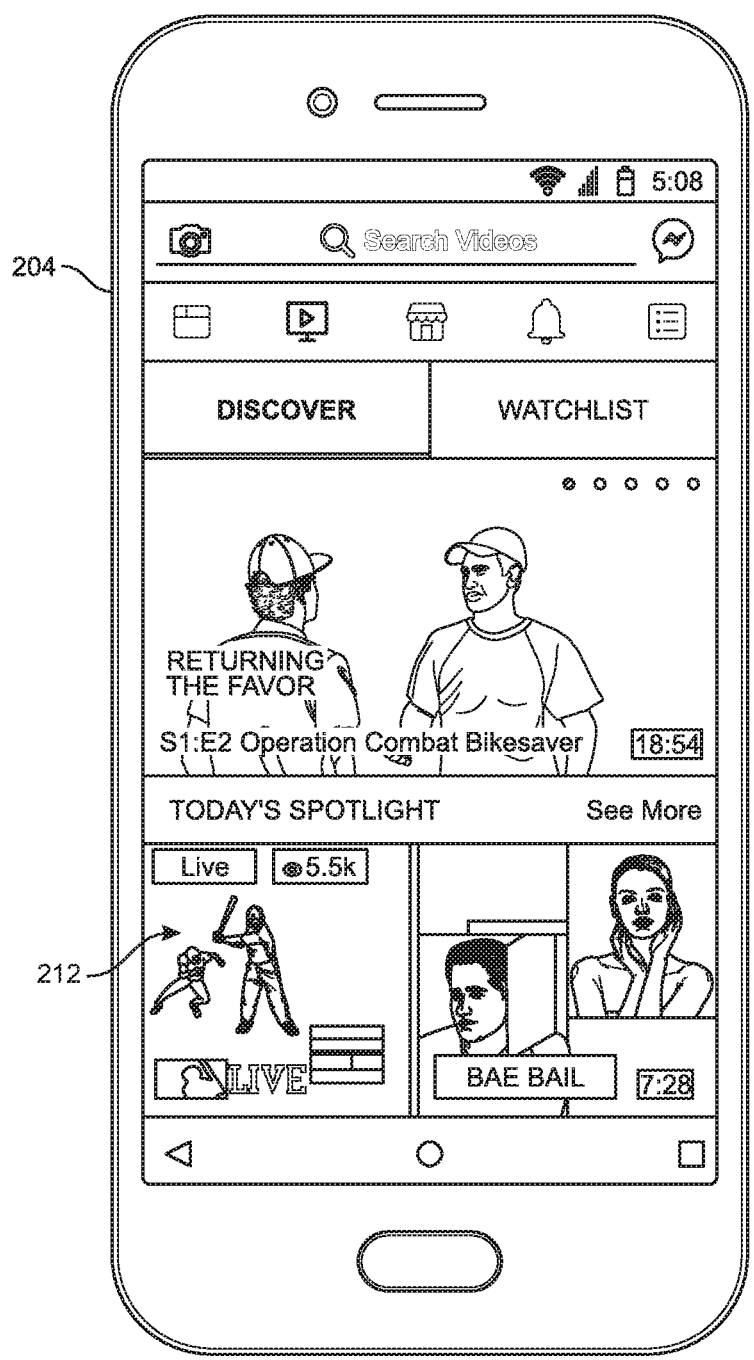
FIG. 4 is an illustration of an additional exemplary consumption interface in which exemplary platform-recommended content is displayed.

FIG. 3 illustrates an exemplary embodiment of consumption interface 228 in which consumption interface 228 represents a scrollable list of social media posts (e.g., a newsfeed). In this embodiment, display module 226 may display content 212 as a recommended sponsored post within the scrollable list of social media posts. FIG. 4 illustrates an exemplary embodiment of consumption interface 228 in which consumption interface 228 represents a "Recommended Videos" interface. In this embodiment, display module 226 may display content 212 as a recommended video (e.g., within a stream and/or collection of recommended videos).

In examples in which additional content 222 receives a social-engagement score (i.e., additional social-engagement score 224) that falls below threshold 220, the systems described herein may respond in a variety of ways. For example, in one example, display module 226 may operate in accordance with a policy to not display as recommended content any content with a social-engagement score that falls below threshold 220. In this example, display module 226 may determine not to display additional content 222 as platform-recommended content in response to determining that additional social-engagement score 224 falls below threshold 220.

In additional or alternative examples, display module 226 may operate in accordance with a policy that a designated percentage of the platform-recommended content displayed within consumption interface 228 within a designated time frame must have a social-engagement score that meets or surpasses threshold 220, but that the remaining percentage of the platform-recommended content may have a social-engagement score that falls below threshold 220. As a specific example, the policy may indicate that ninety percent of the platform-recommended content currently being displayed within consumption interface 228 must surpass threshold 220, but that up to ten percent of the platform-recommended content currently being displayed within consumption interface 228 may fall below threshold 220.

In some examples, the designated percentage may be fixed (i.e., the same for all users of platform 206). In other examples, the designated percentage may be adjustable (e.g., based on user viewing history, a region in which the user resides, a user age, and/or a user-selected setting).

In examples in which display module 226 relies on a designated-percentage policy, display module 226 may determine whether to display additional content 222 depending on a percentage of the platform-recommended content being displayed within consumption interface 228, within the designated time frame, that has a social-engagement score that falls below threshold 220. In a first instance, display module 226 may determine that a percentage of platform-recommended content displayed within consumption interface 228 that has a social-engagement score that meets or surpasses threshold 220 would drop below the designated percentage if additional content 222 were added to consumption interface 228. Returning to our specific example, display module 226 may determine that less than ninety percent of the platform-recommended content currently being displayed within consumption interface 228 would have a social-engagement score that meets or surpasses threshold 220 if additional content 222 were displayed within consumption interface 228. In this instance, display module 226 may determine not to display additional content 22 within consumption interface 228 as platform-recommended content in response to the determination that the percentage would drop below the designated percentage.

In a second instance, display module 226 may determine that a percentage of platform-recommended content displayed within consumption interface 228, within the designated time frame, that has a social-engagement score that meets or surpasses threshold 220 would not drop below the designated percentage if additional content 222 were added to consumption interface 228. Returning to our specific example, display module 226 may determine that at least ninety percent of the platform-recommended content displayed within consumption interface 228 would have a social-engagement score that meets or surpasses threshold 220 if additional content 222 were displayed within consumption interface 228. In this instance, display module 226 may display additional content 222 within consumption interface 228 as platform-recommended content in response to the determination that the percentage would not drop below the designated percentage.

As described throughout the present disclosure, the disclosed systems and methods may provide systems and methods for selecting platform-recommend content based at least in part on social engagement generated in response to the content. In one example, a computer-implemented method may include (1) identifying content that has been posted to a platform, (2) creating a social-engagement score for the content based on a measure of an amount of social engagement generated in response to the content, (3) determining that the social-engagement score surpasses a threshold, and (4) in response to determining that the social-engagement score surpasses the threshold, displaying the content within the platform as platform-recommended content.

In some examples, identifying the content may include determining that the content has been posted to the platform more than a threshold amount. In one embodiment, the measure of the amount of social engagement generated in response to the content may be calculated based on the content's rate of social engagement per view. Additionally or alternatively, the measure of the amount of social engagement generated in response to the content may be calculated based on a number of social engagements expressed by viewers of the content.

The social engagement generated in response to the content may include, without limitation, a comment posted to the content, a posting or re-posting of the content, a digital mention of the content, and/or a graphical response affixed to the content. In some examples, determining that the social-engagement score surpasses the threshold may include determining that the content's rate of social engagement per view surpasses the threshold and/or determining that a number of social engagements expressed by viewers of the content surpasses the threshold. In one embodiment, displaying the content within the platform as platform-recommended content may include displaying the content as non-connected content within a media-consumption interface sponsored by the platform.

In one embodiment, the method may further include (1) identifying additional content that has been posted to the platform, (2) creating an additional social-engagement score for the additional content based on a measure of an amount of social engagement generated in response to the additional content, and (3) determining that the additional social-engagement score falls below the threshold. In this embodiment, the method may also include, in response to determining that the additional social-engagement score falls below the threshold, determining not to display the content within the platform as platform-recommended content.

Additionally or alternatively, the method may also include (1) presenting, to a user of the platform, a consumption interface that displays platform-recommended content and (2) identifying a policy that a designated percentage of the platform-recommended content displayed within the consumption interface must have a social-engagement score that surpasses the threshold. In this example, the method may further include (1) determining that a current percentage of platform-recommended content displayed within the consumption interface that has a social-engagement score that surpasses the threshold would drop below the designated percentage if the additional content were added to the consumption interface or (2) determining that a current percentage of platform-recommended content displayed within the consumption interface that has a social-engagement score that surpasses the threshold would not drop below the designated percentage if the additional content were added to the consumption interface.

In examples in which the current percentage would drop below the designated percentage, the method may further include determining not to display the additional content within the consumption interface as platform-recommended content in response to the determination that the current percentage would drop below the designated percentage. In examples in which the current percentage would not drop below the designated percentage, the method may further include displaying the additional content within the consumption interface as platform-recommended content in response to the determination that the current percentage would not drop below the designated percentage.

In addition, a corresponding system for implementing the above-described method may include (1) an identification module, stored in memory, that identifies content that has been posted to a platform, (2) a creation module, stored in memory, that creates a social-engagement score for the content based on a measure of an amount of social engagement generated in response to the content, (3) a determination module, stored in memory, that determines that the social-engagement score surpasses a threshold, (4) a display module, stored in memory, that, in response to the determination module determining that the social-engagement score surpasses the threshold, displays the content within the platform as platform-recommended content, and (5) a processor configured to execute the identification module, the creation module, the determination module, and the display module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify content that has been posted to a platform, (2) create a social-engagement score for the content based on a measure of an amount of social engagement generated in response to the content, (3) determine that the social-engagement score surpasses a threshold, and (4) in response to determining that the social-engagement score surpasses the threshold, display the content within the platform as platform-recommended content.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying, by at least one physical processor, content that has been at least one of posted to a platform more than a threshold amount or viewed via the platform more than a threshold amount;
   calculating, for the content, a social-engagement score indicative of users' willingness to associate themselves with the content publicly, wherein calculating the social-engagement score comprises calculating a rate of engagement per view by calculating (1) a number of social engagements generated in response to the content relative to (2) a number of views received by the content;
   determining, by the physical processor, that the social-engagement score surpasses a threshold; and
   in response to determining that the social-engagement score surpasses the threshold, displaying, by the physical processor, the content within the platform as platform-recommended content.

2. The computer-implemented method of claim 1, wherein:
   the social-engagement score is specific to a particular region; and
   a user base utilized to calculate the social-engagement score is limited to at least one of (1) users residing in the particular region or (2) users identifying from the particular region.

3. The computer-implemented method of claim 1, wherein:
   the social-engagement score is specific to a particular type of consumption interface; and
   a user base utilized to calculate the social-engagement score is limited to users accessing content via the particular type of consumption interface.

4. The computer-implemented method of claim 1, wherein the social engagements, generated in response to the content, comprise at least one of:
   a comment posted to the content;
   a posting or re-posting of the content;
   a digital mention of the content; or
   a graphical response affixed to the content.

5. The computer-implemented method of claim 4, wherein the graphical response affixed to the content comprises an emoji.

6. The computer-implemented method of claim 1, wherein the content comprises non-connected content.

7. The computer-implemented method of claim 6, wherein displaying the content comprises displaying the content as non-connected content within a media-consumption interface sponsored by the platform.

8. The computer-implemented method of claim 1, further comprising:
identifying additional content that has been posted to the platform;
calculating, for the additional content, an additional social-engagement score indicative of users' willingness to associated themselves with the additional content publicly, wherein calculating the additional social-engagement score comprises calculating, for the additional content, a rate of engagement per view by calculating (1) a number of social engagements generated in response to the additional content relative to (2) a number of views received by the additional content; and
determining that the additional social-engagement score falls below the threshold.

9. The computer-implemented method of claim 8, further comprising, in response to determining that the additional social-engagement score falls below the threshold, determining not to display the additional content within the platform as platform-recommended content.

10. The computer-implemented method of claim 8, further comprising:
presenting, to a user of the platform, a consumption interface that displays platform-recommended content; and
identifying a policy that (1) a designated percentage of the platform-recommended content displayed within the consumption interface must have a social-engagement score that surpasses the threshold but that (2) a remaining percentage of the platform-recommended content displayed within the consumption interface may have a social-engagement score that falls below the threshold.

11. The computer-implemented method of claim 10, further comprising:
determining that adding the additional content to the consumption interface would drop a current percentage of platform-recommended content displayed within the consumption interface that has a social-engagement score that surpasses the threshold below the designated percentage; and
determining not to display the additional content within the consumption interface as platform-recommended content in response to the determination that the current percentage would drop below the designated percentage.

12. The computer-implemented method of claim 10, further comprising:
determining that adding additional content to the consumption interface would not drop a current percentage of platform-recommended content displayed within the consumption interface that has a social-engagement score that surpasses the threshold below the designated percentage; and
displaying the additional content within the consumption interface as platform-recommended content in response to the determination that the current percentage would not drop below the designated percentage.

13. A system comprising:
an identification module, stored in memory, that identifies content that has been at least one of posted to a platform more than a threshold amount or viewed via the platform more than a threshold amount;
a creation module, stored in memory, that calculates, for the content, a social-engagement score indicative of users' willingness to associate themselves with the content publicly, wherein calculating the social-engagement score comprises calculating a rate of engagement per view by calculating (1) a number of social engagements generated in response to the content relative to (2) a number of views received by the content;
a determination module, stored in memory, that determines that the social-engagement score surpasses a threshold;
a display module, stored in memory, that in response to the determination module determining that the social-engagement score surpasses the threshold, displays the content within the platform as platform-recommended content; and
at least one physical processor configured to execute the identification module, the creation module, the determination module, and the display module.

14. The system of claim 13, wherein:
the identification module further identifies additional content that has been posted to the platform;
the creation module further calculates, for the additional content, an additional social-engagement score indicative of users' willingness to associated themselves with the additional content publicly, wherein calculating the additional social-engagement score comprises calculating, for the additional content, a rate of engagement per view by calculating (1) a number of social engagements generated in response to the additional content relative to (2) a number of views received by the additional content; and
the determination module further determines that the additional social-engagement score falls below the threshold.

15. The system of claim 14, wherein, in response to the determination module determining that the additional social-engagement score falls below the threshold, the display module determines not to display the additional content within the platform as platform-recommended content.

16. The system of claim 14, wherein:
the display module is configured to present, to a user of the platform, a consumption interface that displays platform-recommended content; and
the display module operates in connection with a policy that (1) a designated percentage of the platform-recommended content displayed within the consumption interface must have a social-engagement score that surpasses the threshold but that (2) a remaining percentage of the platform-recommended content displayed within the consumption interface may have a social-engagement score that falls below the threshold.

17. The system of claim 16, wherein:
the determination module determines that adding the additional content to the consumption interface would drop a current percentage of platform-recommended content displayed within the consumption interface that has a social-engagement score that surpasses the threshold below the designated percentage; and
the display module determines not to display the additional content within the consumption interface as platform-recommended content in response to the determination that the current percentage would drop below the designated percentage.

18. The system of claim 16, wherein:

the determination module determines that adding the additional content to the consumption interface would not drop a current percentage of platform-recommended content displayed within the consumption interface that has a social-engagement score that surpasses the threshold below the designated percentage; and the display module displays the additional content within the consumption interface as platform-recommended content in response to the determination that the current percentage would not drop below the designated percentage.

19. A non-transitory computer-readable medium comprising one or more computer-readable instructions that, when executed by at least one processor of a computing device, cause the computing device to:

identify content that has been at least one of posted to a platform more than a threshold amount or viewed via the platform more than a threshold amount;

calculate, for the content, a social-engagement score indicative of users' willingness to associate themselves with the content publicly, wherein calculating the social-engagement score comprises calculating a rate of engagement per view by calculating (1) a number of social engagements generated in response to the content relative to (2) a number of views received by the content;

determine that the social-engagement score surpasses a threshold; and in response to determining that the social-engagement score surpasses the threshold, display the content within the platform as platform-recommended content.

20. The non-transitory computer-readable medium of claim 19, wherein the instructions further cause the computing device to:

identify additional content that has been posted to the platform;

calculate, for the additional content, an additional social-engagement score indicative of users' willingness to associated themselves with the additional content publicly, wherein calculating the additional social-engagement score comprises calculating, for the additional content, a rate of engagement per view by calculating (1) a number of social engagements generated in response to the additional content relative to (2) a number of views received by the additional content;

determine that the additional social-engagement score falls below the threshold; and in response to determining the additional social-engagement score falls below the threshold, determine not to display the additional content within the platform as platform-recommended content.

\* \* \* \* \*